May 2, 1961  R. L. WHEARLEY  2,982,889
DISC TYPE HERMETICALLY SEALED ELECTRICAL COMPONENT
Filed May 23, 1957  3 Sheets-Sheet 1

INVENTOR.
ROBERT L. WHEARLEY
BY
ATTORNEYS

May 2, 1961 R. L. WHEARLEY 2,982,889
DISC TYPE HERMETICALLY SEALED ELECTRICAL COMPONENT
Filed May 23, 1957 3 Sheets-Sheet 2

INVENTOR.
ROBERT L. WHEARLEY
BY
ATTORNEYS

INVENTOR.
ROBERT L. WHEARLEY
BY
ATTORNEYS

United States Patent Office 2,982,889
Patented May 2, 1961

2,982,889
DISC TYPE HERMETICALLY SEALED
ELECTRICAL COMPONENT

Robert L. Whearley, Fort Wayne, Ind., assignor, by mesne assignments, to Rea Magnet Wire Company, Inc., Fort Wayne, Ind., a corporation of Delaware Filed May 23, 1957, Ser. No. 661,170

4 Claims. (Cl. 317—158)

This invention relates to hermetically sealed electrical equipment and methods of manufacture thereof. The hermetic sealing or encapsulating of electrical devices, such as transformers, armature receiving coils, resistors, solenoids, and the like, is important both from the points of view of physical protection to the electrically conductive windings and the maintaining of constant electrical values.

It is a primary object of this invention to provide improved hermetically sealed components in which the encapsulating material may be organic or inorganic; particularly the encapsulating component may be a siliceous material or a plurality of siliceous materials, such as glass.

A particular object of this invention is to provide novel methods of constructing hermetically sealed electrical components, which methods permit the utilization of either inorganic or organic insulating material.

An important feature of the invention is in the provision of encapsulated hermetically sealed components which are resistant to relatively high temperatures, that is, above 400 to 500° C. The attainment of such a component is accomplished in the practice of the invention by employing inorganic electrically insulated materials.

A further feature of the invention resides in the novel disc support arrangement of wire coils which may be connected in electrical series to form the winding of the component, the winding being enclosed, sealed and held by the insulating material.

In the preferred embodiment of the invention the encapsulated component is produced by winding wire into spiraled grooves on one face of a disc; the discs are stacked together with other insulating material therebetween, and the coils are electrically connected in series to form the winding of the component.

The encapsulating electrically insulated material is provided by discs which carry the wire of the coils, or by spacer discs between the coil carrying discs, or by both.

The stacked assembly is supported in a mold body and heated sufficiently to cause the insulating material to assume a viscous flowable state, and the insulating material encloses and fixes the coils while at the same time sealing the discs of the assembly together. Cooling and removal from the mold body provides a completed hermetically sealed unit.

The procedure lends itself to mass production methods both in assembly and sealing, as will be noted from the detailed description set out hereinafter.

The invention will be more fully understood by reference to the following detailed description and accompanying drawings wherein.

In the practice of the invention the insulating material which supports the windings and which, in the final product encloses the wires of the windings and seals the assembly together, may as already noted be inorganic or organic. Thus siliceous materials such as glass and polymerizable resins are employed. The invention will be described in specific relation to siliceous materials as such and the final product exhibits materially higher heat resistance.

Figure 2:
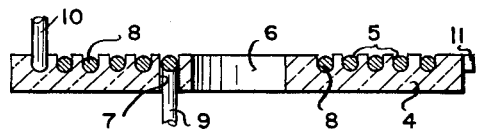
Figure 2 is an enlarged sectional view of a coil carrying disc with a coil positioned therein.
Figure 3:
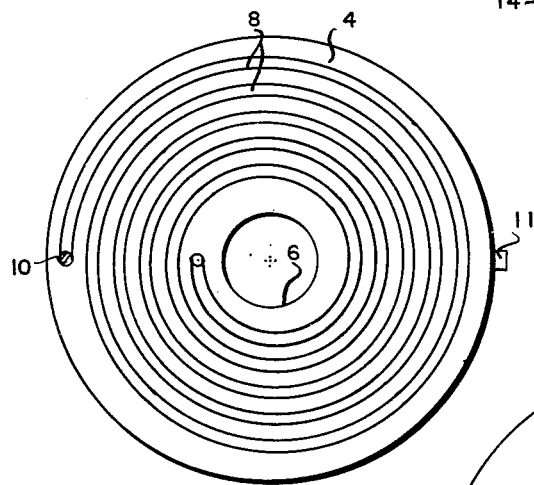
Figure 3 is a plan view of the structure of Figure 2.

Referring to the drawings the numeral 1 generally designates an hermetically sealed coil having windings 2 and a window 3. As shown more clearly in Figure 2 a disc 4 of glass is provided with grooves 5 in spiral form (Figure 3) and the disc has a central opening 6. Adjacent the opening 6 an aperture 7 passes completely through the disc and communicates with the inner ends of the groove 5. The wire 8 is laid in the grooves with one terminal end 9 passing downwardly through the aperture 7 and the other terminal end 10 projecting from the disc surface. The wire 8 may be any usual magnet wire ranging in diameter from about one-thousandth of an inch (No. 50 American wire gauge) to about one-tenth of an inch (No. 10 American wire gauge). Such wire when utilized with glass discs is preferably bare and is of sufficient flexibility to lie within the grooves of the disc. Preferably the wire does not project above the surface of the disc to a material extent. Spacer disc 4 is provided with an integral protuberance 11, the purpose of which will appear more fully hereinafter.

Figure 4:
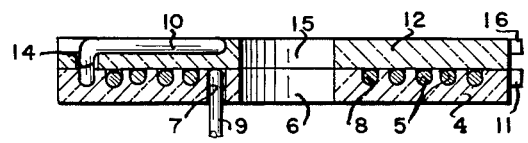
Figure 4 is an enlarged sectional view of a coil carrying disc having mounted in combination therewith a slotted spacer disc.
Figure 5:
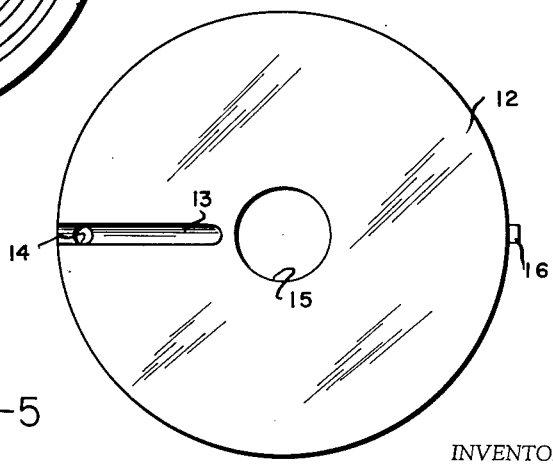
Figure 5 is a top plan view of the structure of Figure 4.

Referring now to Figures 4 and 5, slotted spacer disc 12 is shown positioned on and receiving a wire terminal end of the coil carrying disc 4. Spacer disc 12 has a radially extending slot 13 provided at the outer periphery thereof with a small hole 14.

As shown in Figure 4 the terminal end 10 of the wire 8 extends upwardly through the hole 14 and lies in the slot 13. The spacer disc 12 is also provided with a central opening 15 which corresponds to the opening 6 of the disc 4.

Figure 6:
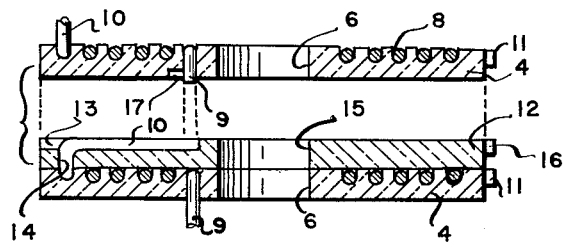
Figure 6 is an enlarged view in section illustrating the mode of combining the coil carrying discs with a spacer disc.

Figure 6 illustrates a further step in the process wherein a second coil carrying disc 4 is positioned over the spacer disc 12 and about to be positioned on the spacer disc. The protuberance 11 aligns with an integral protuberance 16 of the spacer disc 12.

Figure 7:
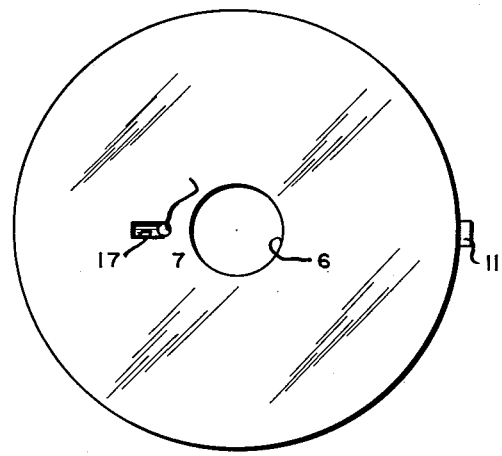
Figure 7 is a bottom plan view of a coil carrying disc.

As shown the spacer disc 4 has a sort radial slot 17 which terminates at the bottom end of the aperture 7. The protuberances 11, 16 are so aligned that the slot 17 (Figure 7) lies over the slot 13 of spacer disc 12. Thus the inner end 9 of the wire of the second coil carrying disc is in position to contact the terminal end 10 of the first coil carrying disc when the coil carrying discs are brought together to sandwich the spacer disc 12 therebetween.

Most suitably the slot 17 has a drop of solder applied thereto prior to the bringing together of the components and this solder in a later operation of the process fuses to join the terminal ends and to connect the coil of the lower (Figure 6) disc in electrical series with the coil of the upper disc to thereby form a winding.

The lower disc 4 of an assembly may be provided with a slot 17, if so desired, but such is not necessary. Further, the wire terminal 9 of the intermediate coil carrying discs may, if desired, be turned on itself into the slot 17 or it may project slightly therefrom, as shown in Figure 6.

Figure 8:
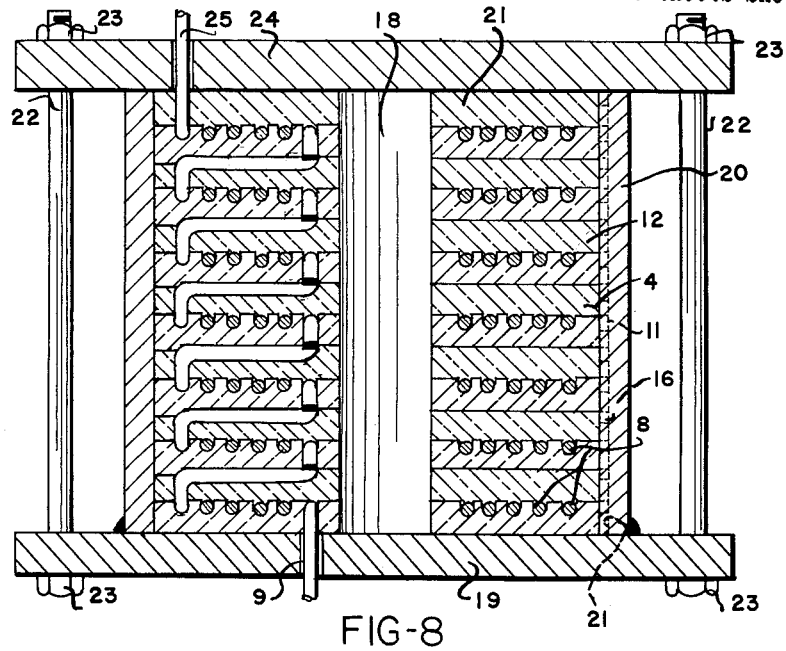
Figure 8 is a view in section illustrating a disc assembly positioned within a mold.

Referring now to Figure 8, an assembly built up as described in connection with Figure 6 is shown housed within an enclosing mold. The assembly is positioned on a solid metal core preferably of steel and indicated at 18. At one end the core is abutted by an end plate 19 to which is secured, as by welding, a metal cylinder 20. The cylinder 20 is recessed longitudinally at 21 to receive the protuberances 11, 16 of the discs 4, 12, respectively. Rods 22 threaded at their ends to receive nut 23 cooperate with a second end plate 24 to enclose the assembly. The end plate 24 has an opening 25 through which one winding end projects, while the other end projects through the plate 19.

The structure of Figure 8 is suitably placed in an oven or on a conveyor belt which passes through an oven to heat the same until the glass becomes viscous enough to flow to enclose and seal the wire forming the winding.

It is to be noted that the insulating material if desired may be of one type of glass. In this connection the glass may have softening points as low as 900° F., and preferably have thermal coefficients of expansion closely approaching that of the electrically conductive wire forming the coils. Siliceous materials embodying relatively high percentages of lead oxide, boric oxide and alumina are useful as low softening point glasses. The lower softening point glasses are particularly useful as spacer discs when the coil carrying discs are of a relatively high softening point glass.

High softening point glasses are, for example, the borosilicates, such as the soft borosilicates. Borosilicates having a softening point in the range of 1600 to 1800° F. may be used as coil carrying discs in conjunction with spacer discs of glass having a softening point in the range of 900 to 1300° F. The silica-lime-alumina system glasses may also be used as the coil carrying disc component.

When a realtively low softening point glass is used as the spacer disc and interposed between coil carrying discs it is only necessary that the temperature in the heating operation be sufficient to render the spacer discs viscous— such that the glass will flow above the wires in the adjacent coil carrying disc enclosing the same and sealing the assembly.

Figure 1:
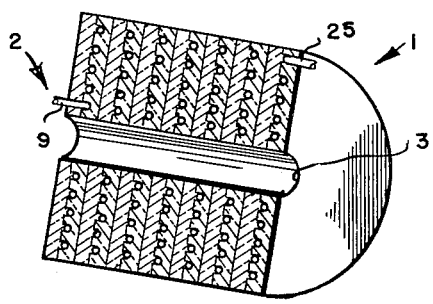
Figure 1 is a perspective view, partially in section, of a completed coil.

Upon removal from the oven or heating conveyor the assembly is cooled to about room temperature, the mold removed, and the core taken from the assembly to provide the window 3 (Figure 1). The product will then appear as generally designated at 1 in Figure 1 and is a compact arrangement of coils extending in parallel planes, bonded together by a mass of insulating material which extends through, closes and seals the winding formed by the plurality of coils.

Figure 9:
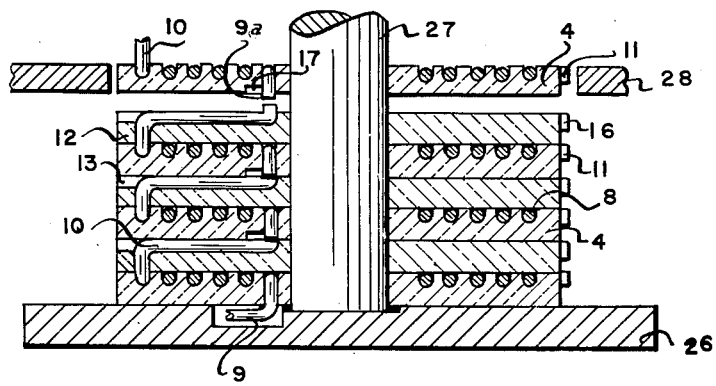
Figure 9 is a view in section illustrating an alternate method of connecting the coils and the coil carrying discs in series to form a winding.

Figure 9 illustrates schematically a further embodiment of the invention wherein a plate 26 having welded thereto a core 27 receives the stacked arrangement of coil carrying and spacer discs. As each coil carrying disc is applied to the core it is held in any convenient manner as by a jig at 28 to permit a soldering or uniting of the lead 10 with the adjacent lead 9a (Figure 9).

The length of the leads necessary is dependent upon the particular arrangement of the jig structure, it being only necessary that the wires be of sufficient length to permit the mechanical manipulation necessary for the uniting of the leads such that the winding is formed by the plurality of coils in electrical series.

The end leads of the electrical component, that is 9 and 10, may be brought out of the assembly in any convenient manner, or where the coil carrying disc 4 is of relatively high melting point and is not itself softened by the heating process, the lead 9 may be housed as shown in Figure 9 within the plate 26.

Figure 10:
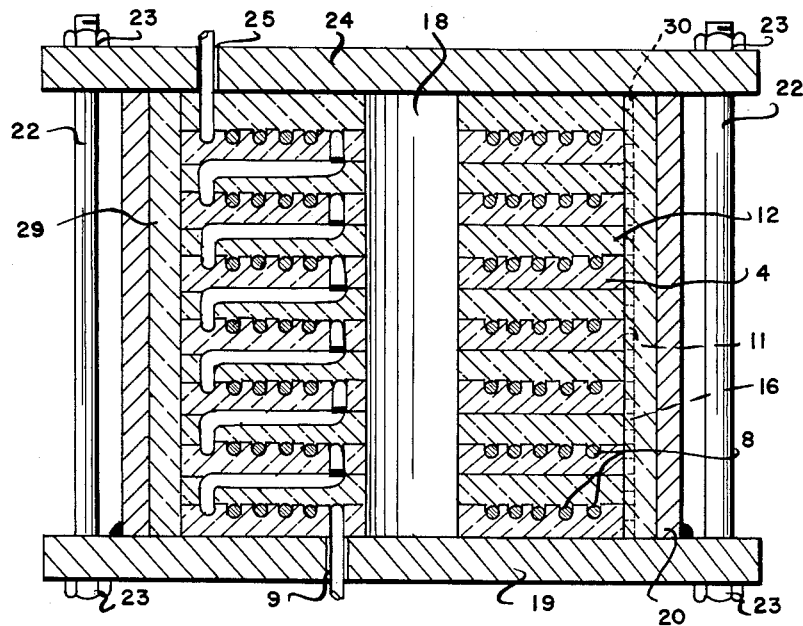
Figure 10 is a view similar to that shown in Figure 8 but with the disc assembly enclosed by a sleeve.

Referring now to Figure 10 there is shown therein a further embodiment of the invention, which differs from the embodiment of Figure 8 in the provision of a glass sleeve 29 which is provided with a longitudinally extending channel 30 similar to the channel or slot 20 of Figure 8. This channel receives the protuberances 11, 16 and serves to align the discs. Further the sleeve 29 itself serves to protect the assembly against mechanical injury.

As already noted it is preferable that the encasing insulating material and the wire of the windings have approximately the same coefficients of thermal expansion. Such is desirable where the windings are to be operated under high temperature conditions in order to avoid the development of strains in the insulating material.

Suitable materials for the wire include copper, steel, nickel, silver, aluminum, aluminum coated silver, and copper coated alloys, such as the nickel-iron alloys; a nickel-iron alloy containing about 48 percent by weight of nickel and 52 percent by weight of iron, copper clad if so desired, is useful. No insulation coating is required on the wire itself in the practice of the invention; bare wire is employed, but insulation may be used as a coating where temperature and operating conditions permit.

The wire may be wound in the discs as closely as the spacing of the grooves permit. While for the sake of clarity in the drawings the turns and number of windings have been limited, it will be appreciated that the number of windings may be materially increased and will depend upon the size of the wire in any given component.

Organic materials useful as the insulation include the resins, particularly those which soften in heat and resolidify, for example, the styrenes, methyl-methacrylates, and vinyl acetates. In general the resins are utilizable where the final product is not subjected to excessive temperature conditions.

It is further to be noted that in instances where the coil carrying disc is not of itself to be rendered viscous by the heat, it may be of a ceramic material, or of any suitable material having a higher softening point than the material of the spacer discs.

This application is related to:

Serial No. 657,893—Robert L. Whearley and Evert A. Mol, filed May 8, 1957, title: Insulated Wire Particularly for Coils and the Manufacture Thereof;

Serial No. 661,169—Robert L. Whearley, filed May 23, 1957, title: Electrical Apparatus and Method of Manufacturing the Same;

Serial No. 699,965—Robert L. Whearley, Leo J. Novak, Fritz O. Deutscher, filed December 2, 1957, title: Insulated Electrical Equipment and Process of Making;

Serial No. 700,044—Robert L. Whearley and Hermann C. Heckel, filed December 2, 1957, title: Heat Resistant Insulated Electrical Components and Process of Making;

Serial No. 700,173—Robert L. Whearley and Hermann C. N. Heckel, filed December 2, 1957, title; Electrical Components Insulated With Glass and Process of Making;

all assigned to the same assignee as the present invention.

It will be understood that this invention is susceptible to modification in order to adapt it to different usages and conditions and accordingly it is desired to comprehend such modifications within this invention as may fall within the scope of the appended claims.

I claim:

1. A hermetically sealed electrical component comprising a winding of wire having a plurality of coils lying in substantially parallel planes, and electrical insulating material extending in a continuous mass through the winding supporting, enclosing and sealing the winding, the wire of the winding lying within groove means of the insulating material.

2. A hermetically sealed electrical component comprising a grooved disc having the grooves thereof in spiral form in a face of the disc, electrically conductive wire in the spiral grooves forming a coil, the terminal ends of said wire extending in opposite directions from the disc, a spacer disc having a radially extending slot in one face thereof and an aperture through the spacer disc communicating with the said slot, a plurality of such wire-wound grooved discs and spacer discs stacked alternately with a terminal end of each coil wire extending through the aperture of a spacer disc, lying in said slot of the spacer disc and connected to a terminal end of a next coil to provide the coils in electrical series, the electrical insulating material of the grooved and spacer discs being bonded together supporting, enclosing and sealing the winding, and a closing body of electrical insulating material sleeved over the stacked assembly.

3. An encapsulated electrical component comprising a stack of discs of electrical insulating material, alternate discs having a spiral grooved face and being of relatively high softening point, said faces having electrically conductive wire wound therein to form a plurality of parallel, planar coils, said coils each having an outer terminal end thereof extending through an aperture and a radially extending slot of an abutting disc into electrical connection with a next coil, said next coil having an inner terminal end thereof connected electrically to said outer terminal end of the preceding disc to provide the coils in electrical series, the others of said discs, having the slots therein, being of relatively lower softening point material and fused to the discs adjacent enclosing and sealing the coils.

4. A hermetically sealed electrical component comprising a grooved disc having the grooves thereof in spiral form in a face of the disc, electrically conductive wire in the spiral grooves forming a planar coil, said coil having terminal ends extending from opposite sides of said disc, a spacer disc having a radially extending slot in one face thereof and an aperture through said spacer disc adjacent the outer periphery of said disc communicating with said slot, a plurality of such wire-wound grooved discs and spacer discs stacked alternately with a terminal end of each planar coil extending from an inner end of said spiral groove to said slot in said spacer disc and through said aperture to a terminal end of a next coil on the outer end of said spiral groove of the said next coil to thereby provide said winding from the outer end of each said disc groove to the inner end of said groove and whereby the coils are connected in electrical series, the electrical insulating material of the grooved and spacer discs being bonded together supporting, enclosing and sealing the winding, and a closing body of electrical insulating material sleeved over the stacked assembly.

References Cited in the file of this patent

UNITED STATES PATENTS

| | | |
|---|---|---|
| 677,862 | Dwyer | July 9, 1901 |
| 812,657 | Kitsee | Feb. 13, 1906 |
| 1,017,348 | Murray et al. | Feb. 13, 1912 |
| 2,348,055 | Chapman | May 2, 1944 |
| 2,506,026 | Kifer et al. | May 2, 1950 |
| 2,583,854 | Kehbel | June 29, 1952 |
| 2,654,861 | Khouri | Oct. 6, 1953 |
| 2,707,693 | Dorst | May 3, 1955 |
| 2,728,879 | Erikson | Dec. 27, 1955 |
| 2,739,371 | Grisdale et al. | Mar. 27, 1956 |
| 2,807,869 | Rice | Oct. 1, 1957 |
| 2,892,168 | Seidel et al. | June 23, 1959 |